(12) United States Patent
Nagoshi et al.

(10) Patent No.: US 8,408,180 B2
(45) Date of Patent: Apr. 2, 2013

(54) CONTROL APPARATUS FOR TURBOCHARGED DIESEL ENGINE

(75) Inventors: Masahiro Nagoshi, Hiroshima (JP);
Masayuki Tetsuno, Hiroshima (JP);
Masaharu Marumoto, Hiroshima (JP)

(73) Assignee: Mazda Motor Corporation (JP)

( * ) Notice: Subject to any disclaimer, the term of this patent is extended or adjusted under 35 U.S.C. 154(b) by 237 days.

(21) Appl. No.: 13/025,993

(22) Filed: Feb. 11, 2011

(65) Prior Publication Data

US 2011/0239645 A1 Oct. 6, 2011

(30) Foreign Application Priority Data

Mar. 31, 2010 (JP) ................................. 2010-080413

(51) Int. Cl.
*F02B 3/00* (2006.01)
*F02D 23/00* (2006.01)

(52) U.S. Cl. ............... 123/299; 60/602; 60/603; 60/601

(58) Field of Classification Search ............ 60/601–603; 123/299
See application file for complete search history.

(56) References Cited

U.S. PATENT DOCUMENTS

| | | | | |
|---|---|---|---|---|
| 6,591,818 B2* | 7/2003 | Sasaki et al. | ............. | 123/568.12 |
| 6,666,020 B2* | 12/2003 | Tonetti et al. | ................. | 123/299 |
| 6,694,945 B2* | 2/2004 | Kawaguchi et al. | .......... | 123/299 |
| 6,755,176 B2* | 6/2004 | Takeuchi et al. | ............... | 123/299 |
| 6,848,414 B2* | 2/2005 | West et al. | ...................... | 123/299 |
| 7,140,345 B2* | 11/2006 | Gioannini et al. | ............. | 123/299 |
| 7,520,260 B2* | 4/2009 | Nakamura et al. | ............ | 123/299 |

FOREIGN PATENT DOCUMENTS

JP 2003-120353 A 4/2003

* cited by examiner

*Primary Examiner* — Thai Ba Trieu
(74) *Attorney, Agent, or Firm* — Studebaker & Brackett PC; Donald R. Studebaker

(57) ABSTRACT

Disclosed is a control apparatus for a turbocharged diesel engine. The control apparatus comprises an engine start controller (10) operable, when an engine restart condition associated with a demand for vehicle start is satisfied, to execute a split-injection control to perform a main injection for injecting fuel at a timing around a top dead center of a compression stroke, and a post injection for injecting fuel in an expansion stroke following the main injection, during the engine restart control, and, when an engine restart condition nonassociated with the demand for vehicle start is satisfied, to execute the engine restart control to perform only the main injection without executing the split-injection control. This makes it possible to optimize the engine restart control to be execute in response to satisfaction of the engine restart condition, depending on the presence or absence of the demand for vehicle start.

6 Claims, 5 Drawing Sheets

CONTROL APPARATUS FOR TURBOCHARGED DIESEL ENGINE

BACKGROUND OF THE INVENTION

1. Field of the Invention

A technique disclosed herein relates to a control apparatus for a turbocharged (turbo-supercharged) diesel engine, particularly, a control at start of an automatically-stopped diesel engine.

2. Description of the Background Art

A control apparatus for a turbocharged diesel engine is described, for example, in JP 2003-120353A. In order to solve a problem that, in the event of a demand for vehicle acceleration, an increase in air intake amount fails to follow an increase in fuel injection amount due to delay in speed rise of a turbocharger to cause deterioration in exhaust emission values, the control apparatus is configured, in response to the demand for vehicle acceleration, to perform a post injection following a main injection, to increase exhaust gas energy so as to promote a speed rise of the turbocharger.

Meanwhile, as measures for improvement in fuel economy, reduction in $CO_2$ emissions, etc., there has been a so-called idle stop system designed, for example, to automatically stop an engine when a given engine stop condition is satisfied during a temporary stop of a vehicle, and then restart the engine when a given engine restart condition is satisfied. Therefore, it is contemplated to employ such an idle stop system in the above turbocharged engine.

In the idle stop system, the engine restart condition is roughly classified into a first engine restart condition associated with a demand for vehicle start, to be satisfied, for example, when a driver depresses an accelerator pedal, and a second engine restart condition nonassociated with the demand for vehicle start, to be satisfied when a vehicle system's demand nonassociated with the demand for vehicle start occurs, for example, when an SOC (State-of-Charge) of a battery becomes lower than a predetermined value, or when an activation of a compressor for an air-conditioning system becomes necessary.

In the above two cases, when the engine restart condition nonassociated with the demand for vehicle start is satisfied, it is desirable to complete an engine start-up within a short period of time, and, after completion of the engine start-up, stand by for issue of the demand for vehicle start, according to a depression of an accelerator pedal by a driver, etc. On the other hand, when the engine restart condition associated with the demand for vehicle start is satisfied, it is necessary not only to complete an engine start-up within a short period of time but also to allow a vehicle to be started and accelerated just after completion of the engine start-up. During this control, in view of achieving enhanced vehicle start/acceleration performance, it is desirable that turbocharging is promptly initiated. As above, a need during engine start in response to satisfaction of an engine restart condition varies depending on the presence or absence of the demand for vehicle start.

SUMMARY OF THE INVENTION

A technique disclosed herein has been made in view of the above point, and an object thereof is to optimize an engine restart control depending on the presence or absence of a demand for vehicle start, when an engine restart condition for restarting a turbocharged diesel engine is satisfied.

Specifically, the technique disclosed herein is based on a diesel engine equipped with a turbocharger having a turbine provided in an exhaust passage thereof, and designed to change a fuel injection mode for the engine between when an engine restart condition associated with a demand for vehicle start is satisfied, and when an engine restart condition nonassociated with the demand for vehicle start is satisfied.

More specifically, when the engine restart condition associated with the demand for vehicle start is satisfied, in view of allowing turbocharging to be promptly initiated so as to achieve enhanced vehicle start/acceleration performance after completion of an engine start-up, a split-injection control is executed to perform a main injection for injecting fuel at a timing around a top dead center of a compression stroke, and a post injection for injecting fuel in an expansion stroke following the main injection. Based on the split-injection control, exhaust gas energy is increased to quickly raise a turbine rotation speed from a zero value.

On the other hand, when an engine restart condition nonassociated with the demand for vehicle start is satisfied, the split-injection control is not executed to avoid unnecessary fuel consumption, because there is no need to promptly initiate the turbocharging.

More specifically, disclosed herein is a control apparatus for a diesel engine mounted on a vehicle, wherein the diesel engine is equipped with a fuel injection valve for injecting fuel into a combustion chamber thereof, and a turbocharger having a turbine provided in an exhaust passage thereof. The control apparatus comprises an engine start controller which is configured, when a given engine stop condition is satisfied, to automatically stop the diesel engine, and, when a given engine restart condition is satisfied, to execute a given engine restart control for combusting fuel supplied to the combustion chamber through the fuel injection valve.

The engine start controller is operable, when an engine restart condition associated with a demand for vehicle start is satisfied, to execute a split-injection control to perform a main injection for injecting fuel at a timing around a top dead center of a compression stroke, and a post injection for injecting fuel in an expansion stroke following the main injection, during the engine restart control, and, when an engine restart condition nonassociated with the demand for vehicle start is satisfied, to execute the engine restart control to perform only the main injection without executing the split-injection control.

DESCRIPTION OF THE PREFERRED EMBODIMENTS

Figure 1:
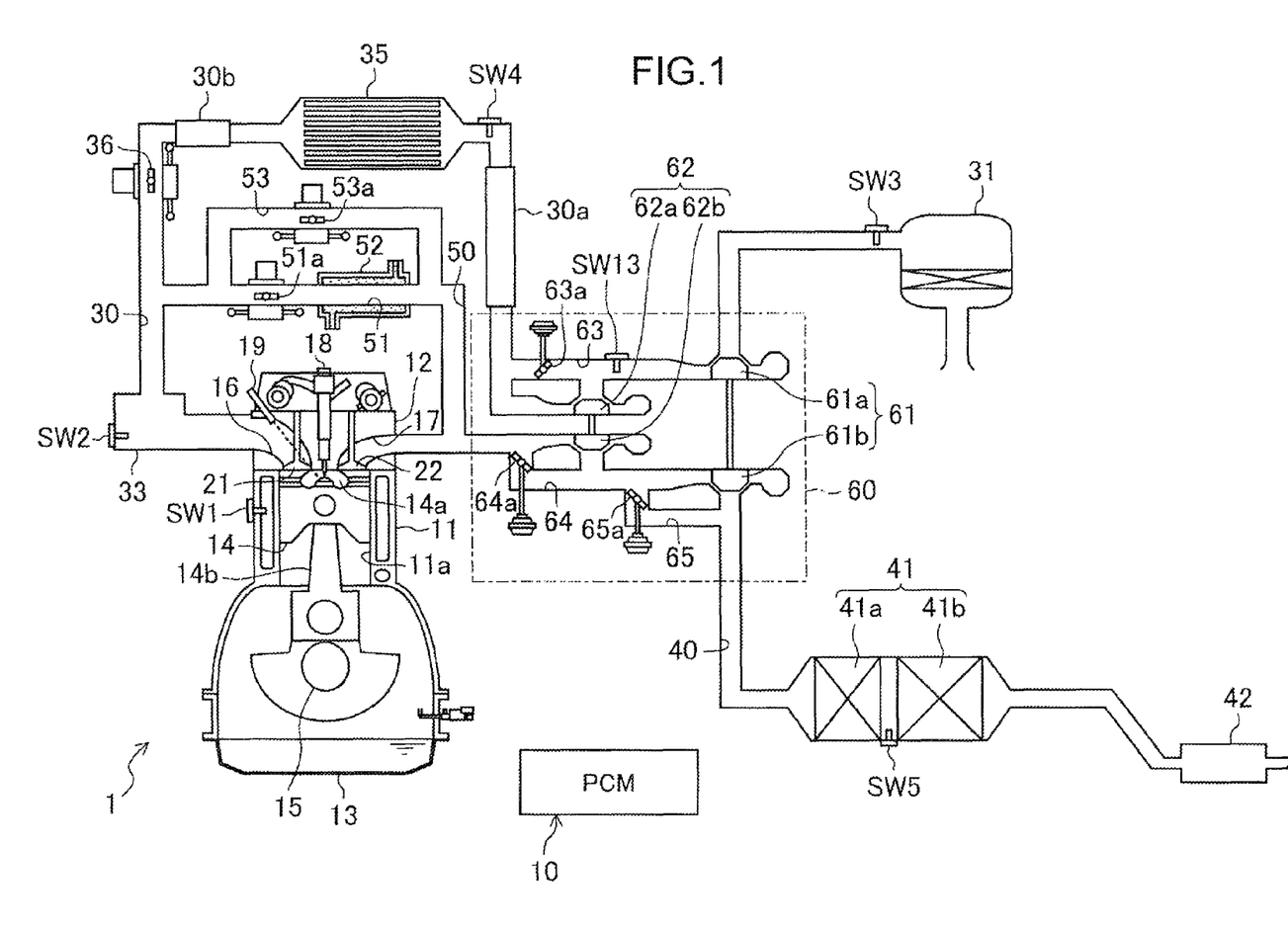
FIG. 1 is a schematic diagram showing a structure of a turbocharged diesel engine employing a control apparatus according to one embodiment of the present invention.
Figure 2:
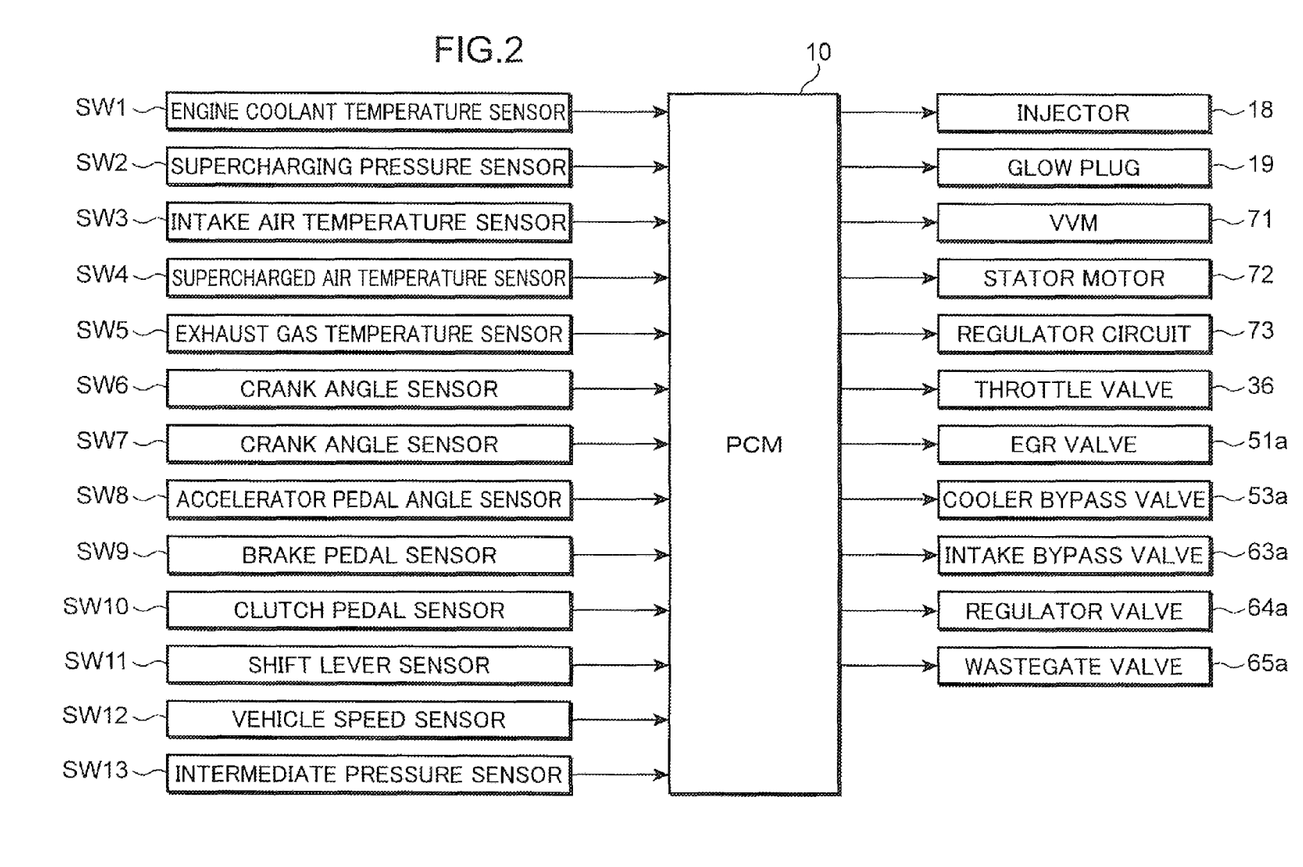
FIG. 2 is a block diagram showing a configuration of the control apparatus.

With reference to the drawings, a turbocharged diesel engine control apparatus of the present invention will be now be described based on one embodiment thereof. It is understood that the following preferred embodiment is basically shown and described by way of illustration only. FIGS. 1 and 2 schematically show a structure of an engine 1 employing the control apparatus according to one embodiment of the present invention. The engine 1 is a diesel engine mounted on a vehicle, wherein it comprises a cylinder block 11 provided with a plurality of cylinders 11a (in FIG. 1, only one of them is illustrated), a cylinder head 12 provided on the cylinder block 11, and an oil pan 13 which stores therein lubricating oil. A piston 14 is fittingly inserted in each of the cylinders 11a of the engine 1 in a reciprocatable manner, and a cavity defining a bowl-shaped (toroidal-shaped) combustion chamber 14a is formed in a top surface of the piston 14. The piston 14 is connected to a crankshaft 15 through a connecting rod 14b. The cylinder block 11 is provided with an engine coolant temperature sensor SW1 for detecting a temperature of engine coolant.

The cylinder head 12 is formed with an intake port 16 and an exhaust port 17 for each of the cylinders 11a, and provided with an intake valve 21 and an exhaust valve 22 for opening and closing respective openings of the intake port 16 and the exhaust port 17 on the side of the combustion chamber 14a. In a valve operating system for driving the intake and exhaust valves 21, 22, a hydraulically-actuated variable valve mechanism 71 (see FIG. 2, hereinafter referred to as VVM (Variable Valve Motion) mechanism) is provided on the side of the exhaust valve to switch an operation mode of the exhaust valve 22 between a normal mode and a special mode. Although a detailed illustration of a structure of the VVM mechanism 71 is omitted, the VVM mechanism 71 comprises: two types of cams different in cam profile, consisting of a first cam having one cam nose and a second cam having two cam noses; and a lost motion mechanism adapted to selectively transmit one of operating states of the first and second cams to the exhaust valve, wherein, when the operating state of the first cam is transmitted, the exhaust valve 22 is operated in the normal mode where it is opened once during an exhaust stroke, whereas, when the operating state of the second cam is transmitted, the exhaust valve 22 is operated in the special mode where it is opened once during an exhaust stroke and further opened once during an intake stroke, i.e., the exhaust valve is opened twice. The switching between the normal mode and the special mode by the VVM mechanism 71 is performed by an oil pressure supplied from an engine-driven oil pressure pump (illustration is omitted), and the special mode can be used in control for internal EGR. As means for achieving the switching between the normal mode and the special mode, an electromagnetically-driven valve operating system designed to drive the exhaust valve 22 by an electromagnetic actuator may be employed.

The cylinder head 12 is further provided with an injector 18 (fuel injection valve) for injecting fuel, and a glow plug 19 for warming intake air during a cold start of the engine 1 to enhance ignitability of fuel. The injector 18 is provided in such a manner that a fuel injection port thereof faces the combustion chamber 14a from a roof surface of the combustion chamber 14a, wherein it is operable to directly inject and supply fuel to the combustion chamber 14a at a timing around a top dead center of a compression stroke.

An intake passage 30 is connected to one side surface of the engine 1 in such a manner that it is communicated with the intake port 16 of each of the cylinders 11a. Further, an exhaust passage 40 is connected to the other side surface of the engine 1 to discharge burned gas (exhaust gas) from the combustion chamber 14a of each of the cylinders 11a. In order to supercharge intake air, a large-sized turbocharger 61 and a small-sized turbocharger 62 are provided in the intake passage 30 and the exhaust passage 40.

An air cleaner 31 is provided at an upstream end of the intake passage 30. Further, a surge tank 33 is provided in a vicinity of a downstream end of the intake passage 30. A portion of the intake passage 30 downstream of the surge tank 33 is formed as a plurality of independent passages branched with respect to respective ones of the cylinders 11a, and a downstream end of each of the independent passages is connected to the intake port 16 of a respective one of the cylinders 11a. The surge tank 33 is provided with a supercharging pressure sensor SW2 for detecting a pressure of air to be supplied to the combustion chamber 14a.

The intake passage 30 is provided with an intake air temperature sensor SW3 for detecting a temperature of intake air, respective after-mentioned compressors 61a, 62a of the large-sized and small-sized turbochargers 61, 62, a supercharged air temperature sensor SW4 for detecting a temperature of air compressed by the compressors 61a, 62a, an intercooler 35 for cooling air compressed by the compressors 61a, 62a, and a throttle valve 36 for adjusting an amount of intake air to be supplied to the combustion chamber 14a of each of the cylinders 11a, at respective positions between the air cleaner 31 and the surge tank 33, in this order from an upstream side thereof. The throttle valve 36 is fundamentally set to a fully-opened position. Exceptionally, during an operation of stopping the engine 1, it is set to a fully-closed position to prevent the occurrence of shock.

An upstream portion of the exhaust passage 40 is formed as an exhaust manifold which comprises a plurality of independent passages branched with respect to respective ones of the cylinders 11a and each connected to an outer end of the exhaust port 17 of a respective one of the cylinders 11a, and a merged portion where the independent passages are merged together.

An after-mentioned turbine 62b of the small-sized turbocharger 62, an after-mentioned turbine 61b of the large-sized turbocharger 61, an exhaust gas purifying unit 41 for purifying harmful components in exhaust gas, and a silencer 42, are provided in the exhaust passage 40 at respective positions downstream of the exhaust manifold, in this order from an upstream side thereof.

The exhaust gas purifying unit 41 includes an oxidation catalyst 41a and a diesel particulate filter (hereinafter referred to simply as "filter") 41b, in this order from an upstream side thereof. The oxidation catalyst 41a and the filter 41b are housed in a single casing. The oxidation catalyst 41a is formed as an oxidation catalyst supporting platinum or platinum added with palladium, and designed to promote a reaction for oxidizing CO and HC in exhaust gas to produce $CO_2$ and $H_2O$. The filter 41b is designed to capture or collect particulates such as soot contained in exhaust gas of the engine 1. The filter 41b may be coated with an oxidation catalyst. The exhaust gas purifying unit 41 is provided with an exhaust gas temperature sensor SW5 for detecting a temperature of exhaust gas passing through the oxidation catalyst 41a, at a position between the oxidation catalyst 41a and the filter 41b.

A portion of the intake passage 30 between the surge tank 33 and the throttle valve 36 (i.e., a portion of the intake passage 30 downstream of the small-sized compressor 62a of the small-sized turbocharger 62) and a portion of the exhaust passage 40 between the exhaust manifold and the small-sized turbine 62b of the small-sized turbocharger 62 (i.e., a portion of the exhaust passage 40 upstream of the small-sized turbine 62b of the small-sized turbocharger 62) are connected to each other by an exhaust gas recirculation (EGR) passage 50 for recirculating a part of exhaust gas to the intake passage 30. The EGR passage 50 comprises: a main passage 51 provided with an EGR valve 51a for adjusting an amount of EGR gas to be supplied to the intake passage 30, and an EGR cooler 52 for cooling EGR gas by engine coolant; and a cooler bypass passage 53 for bypassing the EGR cooler 52. The cooler bypass passage 53 is provided with a cooler bypass valve 53a for adjusting an amount of EGR gas which flows through the cooler bypass passage 53.

As shown in FIG. 2, the engine 1 is provided with two crank angle sensors SW6, SW7 for detecting a rotational angle of the crankshaft 15. Specifically, an engine speed (rotational speed) is detected based on a detection signal output from the crank angle sensor SW6, and a crank angular position is detected based on respective detection signals output from the crank angle sensors SW6, SW7 with a phase lag. The engine 1 is further provided with an accelerator pedal angle sensor SW8 for detecting an accelerator pedal angle corresponding to an amount of depression of an accelerator pedal (illustration is omitted) of the vehicle, a brake pedal sensor SW9 for detecting an operation of an brake pedal (illustration is omitted) of the vehicle, a clutch pedal sensor SW10 for detecting an operation of a clutch pedal (illustration is omitted) of the vehicle (for a manual transmission), a shift lever sensor SW11 for detecting an operation of a shift lever (illustration is omitted) of the vehicle, and a vehicle speed sensor SW12 for detecting a vehicle speed.

A structure of each of the large-sized turbocharger 61 and the small-sized turbocharger 62 will be specifically described below.

The large-sized turbocharger 61 includes a large-sized compressor 61a disposed in the intake passage 30, and a large-sized turbine 61b disposed in the exhaust passage 40. The large-sized compressor 61a is disposed in the intake passage 30 at a position between the air cleaner 31 and the intercooler 35 (more specifically, between the intake air temperature sensor SW3 and the supercharged air temperature sensor SW4). The large-sized turbine 61b is disposed in the exhaust passage 40 at a position between the exhaust manifold and the oxidation catalyst 41a.

The small-sized turbocharger 62 includes a small-sized compressor 62a disposed in the intake passage 30, and a small-sized turbine 62b disposed in the exhaust passage 40. The small-sized compressor 62a is disposed in the intake passage 30 at a position downstream of the large-sized compressor 61a. The small-sized turbine 62b is disposed in the exhaust passage 40 at a position upstream of the large-sized turbine 61b.

In other words, the large-sized compressor 61a and the small-sized compressor 62a are serially disposed in the intake passage 30 in this order from the upstream side thereof, and the small-sized turbine 62b and the large-sized turbine 61b are serially disposed in the exhaust passage 40 in this order from the upstream side thereof. Each of the large-sized and small-sized turbines 61b, 62b are rotated by an exhaust gas stream, and the large-sized and small-sized compressors 61a, 62a coupled to respective ones of the large-sized and small-sized turbines 61b, 62b are operated according to the rotation of the large-sized and small-sized turbines 61b, 62b. In this connection, the intake passage 30 is provided with an intermediate pressure sensor SW13 for detecting a pressure of intake air supercharged by the large-sized compressor 61a, at a position between the large-sized compressor 61a and the small-sized compressor 62a.

The large-sized turbocharger 61 has a size greater than that of the small-sized turbocharger 62. This means that the large-sized turbine 61b of the large-sized turbocharger 61 has a moment of inertia greater than that of the small-sized turbine 62b of the small-sized turbocharger 62.

Further, a small-sized compressor-related intake bypass passage 63 is connected to the intake passage 30 to bypass the small-sized compressor 62a. The intake bypass passage 63 is provided with a small-sized compressor-related intake bypass valve 63a for adjusting an amount of air which flows into the intake bypass passage 63. The intake bypass valve 63a is adapted to be set to a fully-closed position during a non-energized mode (normally closed).

A small-sized turbine-related exhaust bypass passage 64 and a large-sized turbine-related exhaust bypass passage 65 are connected to the exhaust passage 40 to bypass respective ones of the small-sized turbine 62b and the large-sized turbine 61b. The small-sized turbine-related exhaust bypass passage 64 is provided with a regulator valve 64a for adjusting an amount of exhaust gas which flows into the exhaust bypass passage 64, and the large-sized turbine-related exhaust bypass passage 65 is provided with a wastegate valve 65a for adjusting an amount of exhaust gas which flows into the exhaust bypass passage 65. Each of the regulator valve 64a and the wastegate valve 65a is adapted to be set to a fully-open position during a non-energized mode (normally opened).

The small-sized turbine-related exhaust bypass passage 64 serves as a first bypass passage, and the large-sized turbine-related exhaust bypass passage 65 serves as a second bypass passage.

The large-sized turbocharger 61 and the small-sized turbocharger 62 is integrally unitized together with portions of the intake passage 30 and the exhaust passage 40 provided therewith, to form a turbocharger unit 60. The turbocharger unit 60 is attached to the engine 1. An outlet of the portion of the intake passage 30 in the turbocharger unit 60 is connected to an upstream end of the intercooler 35 through a rubber hose 30a. Specifically, the intercooler 35 is attached to a vehicle body, so that vibration different from that in the turbocharger unit 60 attached to the engine 1 occurs therein. Therefore, the rubber hose 30a is provided to absorb respective vibrations of the turbocharger unit 60 and the intercooler 30a so as to keep the different vibrations from interacting with each other. For the same reason, a downstream end of the intercooler 35 and a portion of the intake passage 30 upstream of the throttle valve 36 are connected to each other through a rubber hose 30b.

The above turbocharged engine 1 is controlled by a powertrain control module (hereinafter referred to as "PCM") 10. The PCM 10 is composed of a microprocessor comprising a CPU, a memory, a group of counters/timers, an interface and a bus connecting between respective ones of these devices. The PCM 10 serves as a control apparatus. The PCM 10 is configured to receive inputs of detection signals from the sensors SW1 to SW13 as shown in FIG. 2, and, after performing various calculations based on the received detection signals to determine respective states of the engine 1 and the vehicle, output a control signal to each of the injector 18, the VVM mechanism 71 of the valve operating system, and actuators of the various valves, according to calculation results. The PCM 10 is also configured, during starting of the engine 1, to output a control signal to each of the injector 18 and a starter motor 72, and, according to need, output a control signal to the glow plug 19. Further, the PCM 10 is configured to output a control signal to a regulator circuit 73 incorporated in an alternator coupled to the crankshaft 15 through a timing belt or the like, to control an amount of electric power to be generated, correspondingly to an electrical load of the vehicle, a voltage of a vehicle battery, etc.

Furthermore, the PCM 10 is configured to control operations of the large-sized and small-sized turbochargers 61, 62, depending on an engine operating state. Specifically, the PCM 10 is operable to control an opening degree of each of the small-sized compressor-related intake bypass valve 63a, the regulator valve 64a and the wastegate valve 65a to a value pre-set depending on an operating state of the engine 1.

Figure 3:
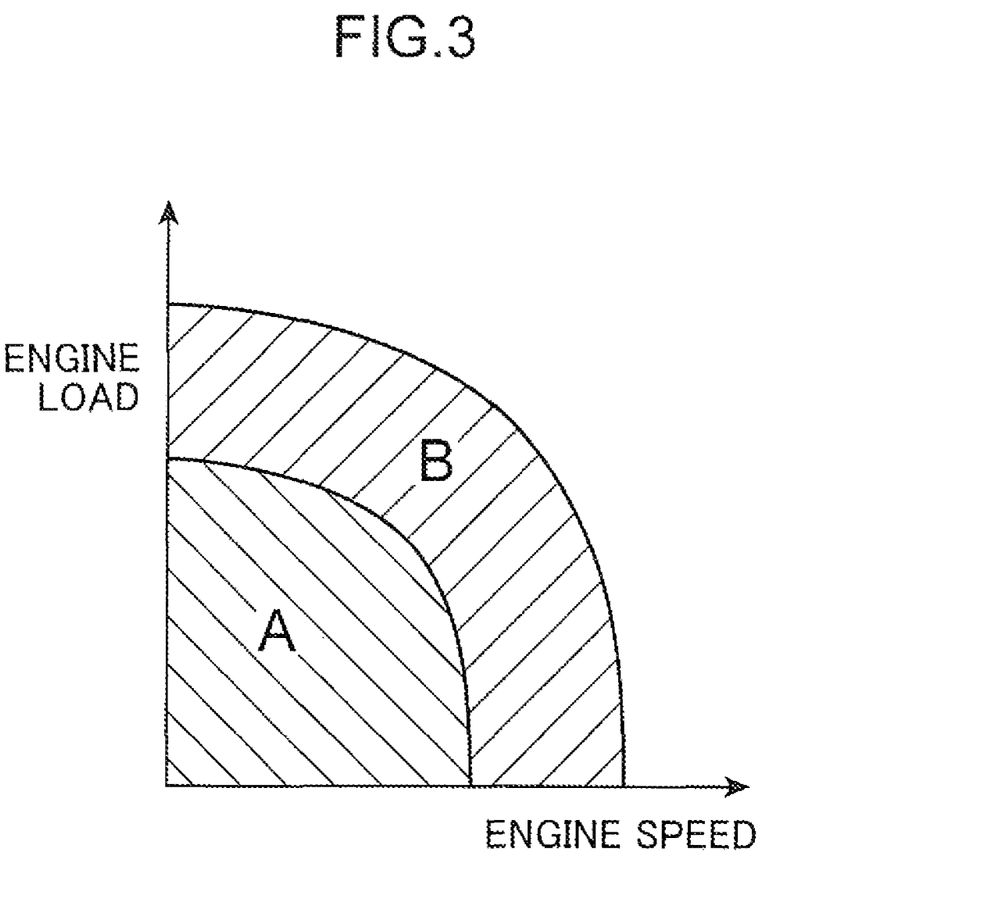
FIG. 3 is a graph showing one example of an operation map for small-sized and large-sized turbochargers.

More specifically, the PCM 10 is operable, in a low-load/low-speed region A (a region below a boundary line set such that an engine load becomes smaller as an engine speed becomes higher) in a map having parameters consisting of an engine speed and an engine load, as shown in FIG. 3, to set each of the intake bypass valve 63a and the regulator valve 64a to an opening degree other than the fully-opened position, and set the wastegate valve 65a to the fully-closed position, to activate both of the large-sized and small-sized turbochargers 61, 62. On the other hand, in a high-load/high-speed region B (a region above the boundary line), the small-sized turbocharger 62 causes an increase in exhaust resistance. Thus, the PCM 10 is operable to set each of the intake bypass valve 63a and the regulator valve 64a to the fully-opened position, and set the wastegate valve 65a to an opening degree close to the fully-closed position, to activate only the large-sized turbocharger 61, while allowing exhaust gas to bypass the small-sized turbocharger 62. In the region B, the wastegate valve 65a is set to be slightly opened so as to prevent overspeed.

In this embodiment, with a view to improvement in fuel economy and reduction in $CO_2$ emissions, the PCM 10 is configured, when a given engine automatic stop condition is satisfied, to automatically stop the engine 1, and, then when a given engine restart condition is satisfied, to restart the engine 1, i.e., to execute a so-called idle stop control.

Specifically, the PCM 10 is operable, when the engine automatic stop condition is satisfied, to stop fuel injection of the injector 18. For example, the engine automatic stop condition may be the following conditions: the engine coolant temperature detected by the engine coolant temperature sensor SW1 is equal to or greater than a predetermined value, and the vehicle is substantially stopped after a brake-pedal depression operation determined by a detection signal of the brake pedal sensor SW9 continues for a given period of time, and a vehicle speed determined based on a detection signal of the vehicle speed sensor SW12 becomes equal to or less than a predetermined extremely low value (e.g., 2 to 5 km/h). In the operation of automatically stopping the engine 1, the piston of the engine 1 is stopped at a position suitable for the restart of the engine 1 by controlling the opening degree of the throttle valve 36, and controlling the alternator through the regulator circuit 73.

Then, the PCM 10 is operable, when the engine restart condition is satisfied, to start supplying fuel to each of the cylinders 11a to combust the fuel, and drive the starter motor 72 to give an assist torque to the engine 1, so as to restart the engine 1 (the PCM 10 serves as an engine start controller in this case). As above, the engine 1 is restarted fundamentally based on combustion although an assist torque is given thereto, which provides a feature that a time required for the restarting becomes extremely short.

For example, the engine restart condition may be the following condition: a remaining capacity of the vehicle battery is reduced to a level requiring recharge; an activation of a compressor for an air-conditioning system becomes necessary; or an occupant's accelerator-pedal operation or clutch operation is detected based on a detection signal from the accelerator pedal angle sensor SW8 or the clutch pedal sensor SW 10. Among them, the condition that a remaining capacity of the vehicle battery is reduced to a level requiring recharge or the condition that an activation of a compressor for an air-conditioning system becomes necessary, can be defined as an engine restart condition nonassociated with a demand for vehicle start. Differently, the condition that an occupant's accelerator-pedal operation or clutch operation is detected, can be defined as an engine restart condition associated with the demand for vehicle start.

In the restart of the engine 1, the PCM 10 is configured to change the valve control for the regulator valve 64a and the wastegate valve 65a between when the engine restart condition associated with the demand for vehicle start is satisfied, and when the engine restart condition nonassociated with the demand for vehicle start is satisfied. With reference to the flowchart in FIG. 4 and the time chart in FIG. 5, the control for restarting the engine 1 by the PCM 10 will be described below. In the flowchart illustrated in FIG. 4, a sequence of steps is set for the sake of for convenience of explanation. Thus, it is understood that the sequence may be appropriately changed, or some of the steps may be executed temporally in parallel.

Figure 4:
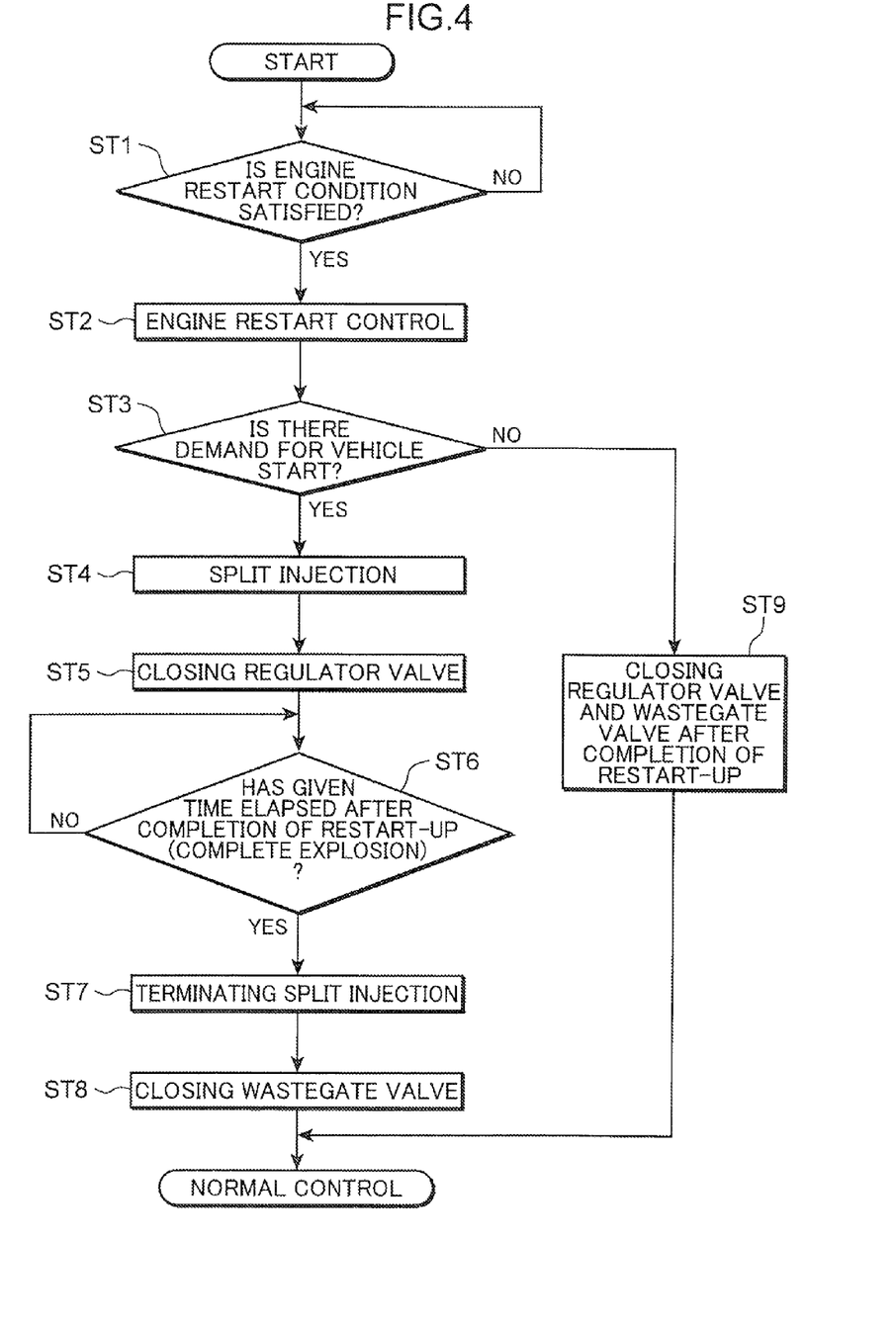
FIG. 4 is a flowchart of an engine restart control to be executed by a PCM.

In the flowchart illustrated in FIG. 4, it is firstly determined whether the engine restart condition is satisfied, in Step ST1. The engine restart condition includes the engine restart condition associated with the demand for vehicle start and the engine restart condition nonassociated with the demand for vehicle start, as mentioned above. If the engine restart condition is not satisfied in Step ST1 (if NO), Step ST1 will be repeated. When the engine restart condition is satisfied (when YES), the routine is shifted to Step ST2.

In Step ST2, the execution of the engine restart control is initiated. Specifically, the fuel supply to each of the cylinders 11a is started. Based on the combustion-based engine restart control, the engine speed is gradually increased with fluctuation, as show in (B) illustrated in FIG. 5. Then, in Step ST3, it is determined whether there is the demand for vehicle start. When there is the demand for vehicle start (when YES), the routine is shifted to Step ST4. Otherwise if there is not the demand for vehicle start (if NO), the routine is shifted to Step ST9. When there is the demand for vehicle start, a vehicle start demand-associated restart execution flag is turned on (see the solid line), as show in (A) illustrated in FIG. 5.

Figure 5:
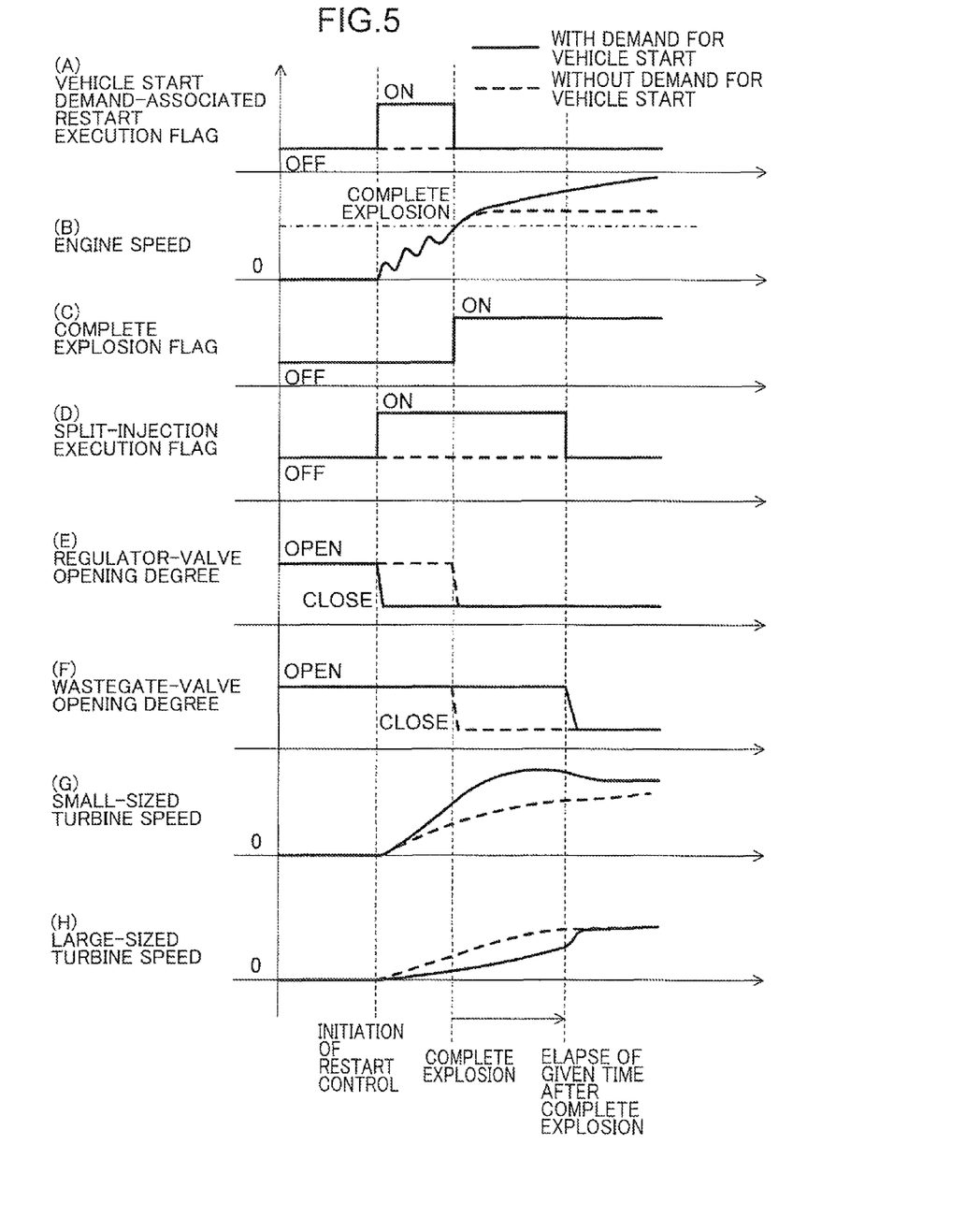
FIG. 5 is a time chart showing one example of respective time-series changes of a vehicle start demand-associated restart execution flag, an engine speed, a complete explosion flag, a split-injection execution flag, a regulator-valve opening degree, a wastegate-valve opening degree, a small-sized turbine rotation speed, and a large-sized turbine rotation speed.

In Step ST4 to be executed when there is the demand for vehicle start, a split-injection control is executed to perform a main injection for injecting fuel at a timing around a top dead center of a compression stroke, and a post injection for injecting fuel in an expansion stroke following the main injection (see the solid line in (D) illustrated in FIG. 5). Thus, the split-injection control is initiated just after the engine restart control is initiated in response to satisfaction of the engine restart condition. Based on the split-injection control including the post injection, exhaust energy is increased without raising the engine speed. Then, in Step ST5, the regulator valve 64a is energized, and thereby closed (see the solid line in (E) illustrated in FIG. 5). Thus, the regulator valve 64a is closed just after the satisfaction of the engine restart condition. Alternatively, considering that this timing falls within a period where the starter motor 72 is driven, the regulator valve 64a may be closed at an after-mentioned timing, i.e., after completion of start-up of the engine 1. In Step ST5, the regulator valve 64a may be set to the fully-closed position, or a given opening degree close to the fully-closed position. On the other hand, the wastegate valve 65a is maintained in the fully-opened position (normally-opened state) without energization (see the solid line in (F) illustrated in FIG. 5). Based on execution of a first valve control for closing the regulator valve 64a and opening the wastegate valve 65a in the above manner, the large-sized turbine 61b can be bypassed, so that a back pressure of the small-sized turbine 62b is lowered, and thereby a pressure difference before and after the small-sized turbine 62b becomes larger. This makes it possible to quickly raise a rotation speed of the small-sized turbine 62b from a zero value, as indicated by the solid line in (G) illustrated in FIG. 5. The broken line in (G) illustrated in FIG. 5 is one example of a change in the rotation speed of the small-sized turbine 62b in cases where the first valve control is not executed, as described later. On the other hand, the large-sized turbine 61b is bypassed, and thereby a rise in rotation speed of the large-sized turbine 61b becomes slower, as indicated by the solid line in (H) illustrated in FIG. 5.

Then, in Step ST6, it is determined whether a given time has elapsed after completion of restart-up (i.e., after complete explosion) of the engine 1. For example, the determination on complete explosion may be based on the engine speed. After complete explosion of the engine 1, a complete explosion flag is turned on (see (C) illustrated in FIG. 5), and the vehicle start demand-associated restart execution flag is turned off (see (A) illustrated in FIG. 5).

If the given time has not elapsed after the complete explosion (if NO), Step ST6 will be repeated. Otherwise when the given time has elapsed (when YES), the routine is shifted to Step ST7. The Step ST6 is a step of determining whether the rotation speed of the small-sized turbine 62b is increased to a given value or more and the rotation of the turbine 62b becomes stable, after complete explosion of the engine 1. Thus, the "given time" may be preliminarily set through an experimental test or the like, as a time period enough to allow the rotation of the small-sized turbine 62b to become stable. In this embodiment, stability in the rotation of the small-sized turbine 62b is determined based on the elapsed time after the complete explosion. Alternatively, any other suitable parameter may be used which is capable of allowing stability in the rotation of the small-sized turbine 62b to be determined.

In Step ST7 where the given time has elapsed after the complete explosion, and the rotation of the small-sized turbine 62b has become stable, the split-injection control is terminated (see the solid line in (D) illustrated in FIG. 5). Then, Step ST8, the wastegate valve 65a is energized and thereby closed (i.e., set to the fully-closed position or a given opening degree close to the fully-closed position; see the solid line in (F) illustrated in FIG. 5). In this way, the engine restart control to be executed when the engine restart condition associated with the demand for vehicle start is satisfied, is fully completed, and the routine is shifted to a normal control routine. In the above engine restart control, as indicated by the solid line in (G) illustrated in FIG. 5, the rotation speed of the small-sized turbine 62b is promptly raised, so that supercharging using the small-sized turbocharger 62 is promptly initiated during vehicle start/acceleration after completion of start-up of the engine 1. In addition, based on continuing the split-injection control, etc., until the rotation of the small-sized turbine 62b becomes stable, a sufficient supercharging pressure can be ensured to achieve enhanced vehicle start/acceleration performance after completion of restart-up of the engine 1.

Meanwhile, in Step ST9 to which the routine is shifted by the determination in the Step ST3 that there is not the demand for vehicle start, the split-injection control in the Step ST4 is not executed (see the broken line in (D) illustrated in FIG. 5). Moreover, the control for closing the regulator valve 64a in the Step ST5 is not executed (see the broken line in (E) illustrated in FIG. 5). In Step ST9, after the engine 1 is restarted in the above state, a second valve control for closing each of the regulator valve 64a and the wastegate valve 65a is executed. This closing timing is intended to minimize execution of control other than the engine restart control during occurrence of an inrush current caused by driving the starter motor 72 between the initiation of the engine restart control and the complete explosion of the engine 1. However, the restart in the engine 1 is fundamentally performed based on combustion, and the starter motor 72 is simply used as auxiliary means. Thus, each of the regulator valve 64a and the wastegate valve 65a may be closed just after the satisfaction of the engine restart condition. In the second valve control, each of the regulator valve 64a and the wastegate valve 65a is set to the fully-closed position or a given opening degree close to the fully-closed position (see the broken lines in (E) and (F) illustrated in FIG. 5).

Thus, in the engine restart control without the demand for vehicle start, as indicated by the broken lines in (G) and (H) illustrated in FIG. 5, the rotation speed of each of the small-sized turbine 62b and the large-sized turbine 61b is gradually increased, and, after complete explosion of the engine 1, reaches a given value, so that it becomes possible to ready for a subsequent possible demand for vehicle start.

As above, in the control apparatus, when the engine restart condition associated with the demand for vehicle start is satisfied, during a transitional period from initiation of the engine restart control through until a given time elapses after complete explosion (completion of start-up) of the engine 1, the regulator valve 64a is closed, and the wastegate valve 65a is opened, so that a pressure difference before and after the small-sized turbine 62b can be increased during the transitional period. This makes it possible to quickly raise the rotation speed of the small-sized turbine 62b from a zero value, as indicated by the solid line in (G) illustrated in FIG. 5. As a result, it becomes possible to promptly start supercharging using the small-sized turbocharger 62 after completion of start-up of the engine 1, to achieve enhanced vehicle start/acceleration performance in a situation where vehicle start/acceleration is needed just after the completion of start-up of the engine 1, as in the satisfaction of the engine restart condition associated with the demand for vehicle start. In this case, the small-sized turbine 62b is advantageous in raising the rotation speed from a zero value, because a moment of inertia thereof is relatively small.

In addition, the split-injection control including post injection may be combined with the engine restart control to increase exhaust energy, which makes it possible to further quickly raise the rotation speed of the small-sized turbine 62b.

Further, based on maintaining the wastegate valve 65a in an opened state until a given time has elapsed after complete explosion of the engine 1, and continuing the split-injection control until the given time has elapsed after the complete explosion of the engine 1, it becomes possible to allow the rotation speed of the small-sized turbine 62b to promptly reach a given value and become stable, so that a sufficient supercharging pressure can be ensured during vehicle start/acceleration after completion of start-up of the engine 1 to achieve further enhanced vehicle start/acceleration performance.

Differently, when the engine restart condition nonassociated with the demand for vehicle start is satisfied, it is not necessary to quickly raise the rotation speed of the small-sized turbine 62b in the above manner, because there is no need to promptly initiate turbocharging. On the other hand, in this case, it is preferable raise the rotation speed of each of the small-sized turbine 62b and the large-sized turbine 61b to a given value so as to stand by for issue of the demand for vehicle start by a driver after completion of start-up of the engine 1. Thus, when the engine restart condition nonassociated with the demand for vehicle star is satisfied, each of the regulator valve 64a and the wastegate valve 65a is closed to allow the rotation speed of to each of the small-sized turbine 62b and the large-sized turbine 61b to be raised to a given value after completion of start-up of the engine 1. In this case, there is no need for the post injection (split-injection control), and the unnecessary post injection may not be performed, which is advantageous in view of fuel economy performance.

The control of the regulator valve 64a and the wastegate valve 65a is not limited to the use in a diesel engine as in the above embodiment, but the valve control may be used in combination with an idle stop control for a gasoline engine.

In conclusion, features of the above embodiment and advantageous effects thereof will be summarized.

In a control apparatus for a diesel engine mounted on a vehicle, according to the above embodiment of the present invention, the diesel engine is equipped with a fuel injection valve for injecting fuel into a combustion chamber thereof, and a turbocharger having a turbine provided in an exhaust passage thereof. The control apparatus comprises an engine start controller which is configured, when a given engine stop condition is satisfied, to automatically stop the diesel engine, and, then when a given engine restart condition is satisfied, to execute a given engine restart control for combusting fuel supplied to the combustion chamber through the fuel injection valve.

The engine start controller is operable, when an engine restart condition associated with a demand for vehicle start is satisfied, to execute a split-injection control to perform a main injection for injecting fuel at a timing around a top dead center of a compression stroke, and a post injection for injecting fuel in an expansion stroke following the main injection, during the engine restart control, and, when an engine restart condition nonassociated with the demand for vehicle start is satisfied, to execute the engine restart control to perform only the main injection without executing the split-injection control.

In the control apparatus, when the engine restart condition associated with the demand for vehicle start is satisfied, the engine restart control is executed to supply fuel into the combustion chamber of the diesel engine and ignite/combust the fuel to restart the diesel engine. Further, during the engine restart control, the split-injection control for performing the main injection and the post injection is executed. The post injection can increase exhaust energy almost without contribution to an increase in engine torque, so that a rotation speed of the turbine in the exhaust passage can be quickly raised from a zero value. This is advantageous in promptly starting supercharging using the turbocharger. Thus, it becomes possible to achieve enhanced vehicle start/acceleration performance after completion of start-up of the engine.

On the other hand, when the engine restart condition non-associated with the demand for vehicle start is satisfied, only the main injection is performed without executing the split-injection control. In this case, while the prompt supercharging using the turbocharger is not performed, unnecessary fuel consumption can be avoided.

Preferably, in the control apparatus of the present invention, the engine start controller is operable to initiate the split-injection control from a timing of initiation of the engine restart control, and continue the split-injection control until start-up of the diesel engine is completed and a rotation speed of the turbine is raised to a given value.

The initiation of the split-injection control from the timing of initiation of the engine restart control is advantageous in promptly raising the turbine rotation speed. In addition, based on raising the turbine rotation speed to a given value, i.e., continuing the split-injection control until the rotation speed reaches a given value and becomes stable, a sufficient supercharging pressure can be ensured by the turbo charger having a quickly raised rotation speed.

Preferably, when the turbocharger includes a small-sized turbocharger having a small-sized turbine, and a large-sized turbocharger having a large-sized turbine with a size greater than that of the small-sized turbine, the engine start controller is operable to continue the split-injection control until start-up of the diesel engine is completed and a rotation speed of the small-sized turbine is raised to a given value.

The small-sized turbine is advantageous in raising the rotation speed from a zero value, because a moment of inertia thereof is less than that of the large-sized turbine.

More preferably, in the above control apparatus, the large-sized turbine is disposed downstream of the small-sized turbine in the exhaust passage of the diesel engine. The exhaust passage is provided with a first bypass passage for bypassing the small-sized turbine, a regulator valve for selectively opening and closing the first bypass passage, a second bypass passage for bypassing the large-sized turbine, and a wastegate valve for selectively opening and closing the second bypass passage. And the engine start controller is operable to close the regulator valve and open the wastegate valve during the execution of the split-injection control. As used herein, the term "close the regulator or wastegate valve" encompasses to set the valve to a fully-closed position, and to set the valve to a given opening degree close to the fully-closed position. Further, the term "open the regulator or wastegate valve" encompasses to set the valve to a fully-opened position, and to set the valve to a given opening degree close to the fully-opened position.

In the above control apparatus, when the engine restart condition associated with the demand for vehicle start is satisfied, the regulator valve is closed, and the wastegate valve is opened, during the split-injection control, so that a back pressure of the small-sized turbine disposed on a relatively upstream side of the exhaust passage of the engine is lowered. This makes it possible to increase a pressure difference before and after the small-sized turbine, which is advantageous in quickly raising the rotation speed of the small-sized turbine from a zero value. Specifically, in this control apparatus, based on a combination of the split-injection control and the valve control for the regulator valve and the wastegate valve, supercharging using the small-sized turbocharger can be promptly initiated, which is further advantageous in achieving enhanced vehicle start/acceleration performance after completion of start-up of the engine.

What is claimed is:

1. A control apparatus for a diesel engine mounted on a vehicle, wherein the diesel engine is equipped with a fuel injection valve for injecting fuel into a combustion chamber thereof, and a turbocharger having a turbine provided in an exhaust passage thereof, the control apparatus comprising an engine start controller which is configured, when a given engine stop condition is satisfied, to automatically stop the diesel engine, and, when a given engine restart condition is satisfied, to execute a given engine restart control for combusting fuel supplied to the combustion chamber through the fuel injection valve, wherein the engine start controller is operable, when an engine restart condition associated with a demand for vehicle start is satisfied, to execute a split-injection control to perform a main injection for injecting fuel at a timing around a top dead center of a compression stroke, and a post injection for injecting fuel in an expansion stroke following the main injection, during the engine restart control, and, when an engine restart condition nonassociated with the demand for vehicle start is satisfied, to execute the engine restart control to perform only the main injection without executing the split-injection control.

2. The control apparatus as defined in claim 1, wherein the engine start controller is operable to initiate the split-injection control from a timing of initiation of the engine restart control, and continue the split-injection control until start-up of the diesel engine is completed and a rotation speed of the turbine is raised to a given value.

3. The control apparatus as defined in claim 2, wherein:
the turbocharger includes a small-sized turbocharger having a small-sized turbine, and a large-sized turbocharger having a large-sized turbine with a size greater than that of the small-sized turbine; and
the engine start controller is operable, when the engine restart condition associated with the demand for vehicle start is satisfied, to continue the split-injection control until start-up of the diesel engine is completed and a rotation speed of the small-sized turbine is increased up to a given value.

4. The control apparatus as defined in claim 3, wherein:
the large-sized turbine is disposed downstream of the small-sized turbine in the exhaust passage of the diesel engine;
the exhaust passage is provided with a first bypass passage for bypassing the small-sized turbine, a regulator valve for selectively opening and closing the first bypass passage, a second bypass passage for bypassing the large-sized turbine, and a wastegate valve for selectively opening and closing the second bypass passage; and
the engine start controller is operable to close the regulator valve and open the wastegate valve during the execution of the split-injection control.

5. The control apparatus as defined in claim 1, wherein:
the turbocharger includes a small-sized turbocharger having a small-sized turbine, and a large-sized turbocharger having a large-sized turbine with a size greater than that of the small-sized turbine; and
the engine start controller is operable to continue the split-injection control until start-up of the diesel engine is completed and a rotation speed of the small-sized turbine is raised to a given value.

6. The control apparatus as defined in claim 5, wherein:
the large-sized turbine is disposed downstream of the small-sized turbine in the exhaust passage of the diesel engine;
the exhaust passage is provided with a first bypass passage for bypassing the small-sized turbine, a regulator valve for selectively opening and closing the first bypass passage, a second bypass passage for bypassing the large-sized turbine, and a wastegate valve for selectively opening and closing the second bypass passage; and
the engine start controller is operable to close the regulator valve and open the wastegate valve during the execution of the split-injection control.

* * * * *